Figure 1:
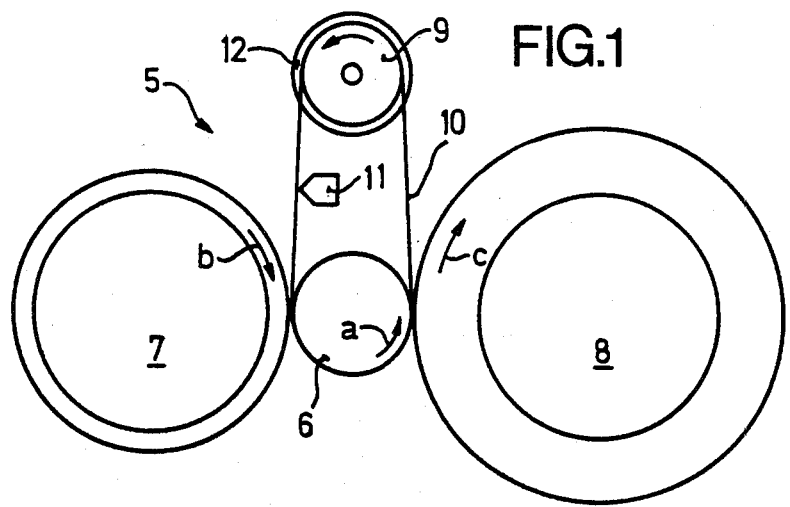

United States Patent [19]

Schoettle et al.

[11] 4,456,160
[45] Jun. 26, 1984

[54] GUIDE DEVICE FOR A RECORDING MEDIUM IN TAPE FORM, ESPECIALLY A MAGNETIC TAPE

[75] Inventors: Klaus Schoettle, Heidelberg; Andreas Ilmer, Ludwigshafen; Joachim Flohr, Viernheim, all of Fed. Rep. of Germany

[73] Assignee: BASF Aktiengesellschaft, Ludwigshafen, Fed. Rep. of Germany

[21] Appl. No.: 312,320

[22] Filed: Oct. 16, 1981

[30] Foreign Application Priority Data

Oct. 27, 1980 [DE] Fed. Rep. of Germany ... 8028597[U]

[51] Int. Cl.$^3$ .................... B65H 23/24; B65H 23/08; G03B 1/04
[52] U.S. Cl. ...................................... 226/195; 226/194; 226/196; 242/155 R; 242/155 M; 242/76
[58] Field of Search ............ 242/75.2, 76, 192, 155 R, 242/155 M; 226/190, 194, 195, 196, 97

[56] References Cited

U.S. PATENT DOCUMENTS

| | | | |
|---|---|---|---|
| 2,724,065 | 11/1955 | Saxl | 226/195 X |
| 3,122,295 | 2/1964 | Davison et al. | 226/97 X |
| 3,398,870 | 8/1968 | Mullan et al. | 226/97 |
| 3,534,893 | 10/1970 | Maxson | 226/97 |
| 3,593,945 | 7/1971 | Richardson et al. | 242/192 |
| 3,843,035 | 10/1974 | Fitterer et al. | 226/196 X |
| 3,951,356 | 1/1974 | Davis, Jr. | 242/192 |
| 4,238,088 | 12/1980 | Schoettle et al. | 242/192 |

OTHER PUBLICATIONS

W. A. Gross, IBM Research Laboratory, San Jose, USA, pp. 138-141.

Primary Examiner—Stuart S. Levy
Assistant Examiner—Lloyd D. Doigan
Attorney, Agent, or Firm—Keil & Witherspoon

[57] ABSTRACT

A guide device for tape-like recording media, especially a reversing guide device for magnetic tapes, that are transported at high speed, which comprises at least one guide roll, around whose periphery the recording medium is guided, and which is rotatably mounted in bearings, a deliberate specific braking torque being produced between the guide roll and its bearings. Further embodiments concern the roughness of the roll's peripheral surface, the design of flanges for the lateral guidance of the recording medium and the use of two guide rolls. The braking torque is produced by braking means acting on the guide roll. The novel guide device can be used advantageously in any high-speed magnetic tape transport apparatus for the recording/reproduction of any type of audio, video or data signal.

8 Claims, 6 Drawing Figures

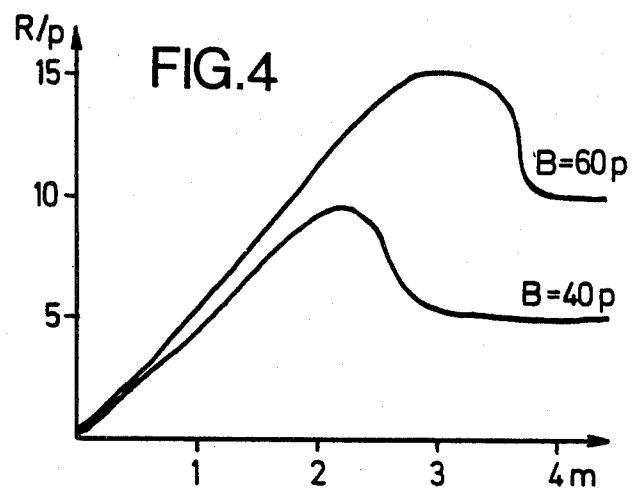
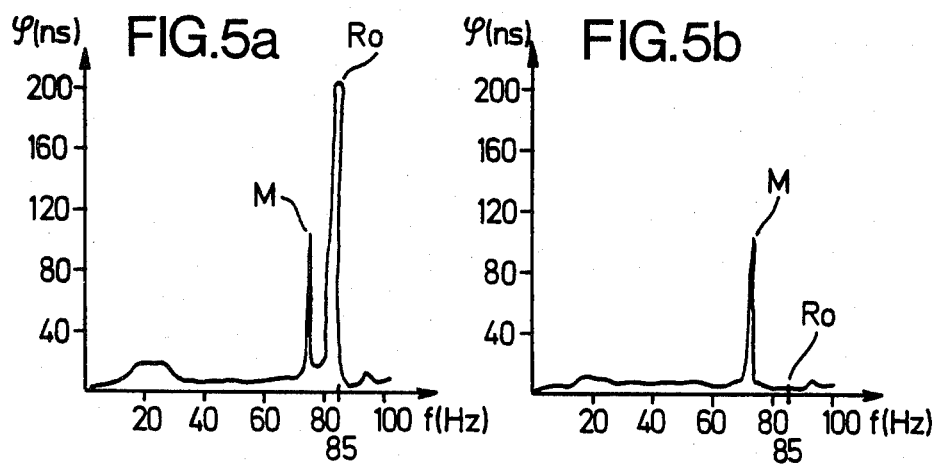

GUIDE DEVICE FOR A RECORDING MEDIUM IN TAPE FORM, ESPECIALLY A MAGNETIC TAPE

The present invention relates to a guide device for a recording medium in tape form, especially a magnetic tape, which is subjected to sharp acceleration in the lengthwise direction, comprising at least one roll rotatably mounted in bearing means, around which roll the transported recording medium is guided.

A guide device of this type is intended in particular for use in magnetic tape transport apparatus having a central capstan, i.e. high-speed tape recorders, and can be used with particular advantage in portable compact video recording equipment which requires a minimum of servicing.

In the case of conventional reversing guide rollers for magnetic tapes, it is usual to minimize the rotary friction of the roller relative to the bearings, and as regards contact between the tape and the roller surfaces, to so correlate these surfaces that tape slip is prevented and the roller constantly turns with the travelling tape. An example of such a guide roller is disclosed in German Published Application DAS No. 1,625,592, the roller being mounted in a virtually frictionless manner by using a ball bearing.

In order to damp the longitudinal oscillations of a magnetic tape subjected to sharp acceleration in the lengthwise direction, German Pat. No. 1,249,340 proposes covering the guide roller with velvet, the pile of the velvet facing the magnetic tape, and being about 5 mm high for half-inch tape. This velvet covering impairs contact between the tape and roller surfaces, and slip occurs.

Further, German Pat. No. 705,813 discloses a sound film transport system wherein a braking roll for the film is provided ahead of the sound drum, so that the requisite tension for driving the flywheel is imparted to the film on the sound drum, thereby avoiding slip.

Further, U.S. Pat. No. 3,593,945 discloses a high-speed magnetic tape transport mechanism having a central capstan, in which fixed guide posts are used. Inevitably, the tape comes into contact with the guide surfaces and this results in wear and in disturbances in tape travel.

Furthermore, stationary air guides for magnetic tape transports are known, a cushion of air substantially preventing contact between the tape and the guide surface (cf., for example, French Pat. No. 1,197,820). Such air guides are extremely expensive.

It is an object of the present invention to improve the guide means for high-speed magnetic tape transports in particular, so as to virtually eliminate, with minimum expense, unwanted signals during recording and playback.

We have found that this object is achieved, surprisingly, if, in a guide device of the type described at the outset, a braking torque is produced between the roll and the bearing means, the torque corresponding to a frictional force of from 2 to 15 p, preferably from 2 to 10 p, acting at the roll periphery.

As a result, the roll is stationary above a certain minimum tape transport speed and essentially only rotates if, owing to the fact that the peripheral surface of the roll and the tape surface in contact therewith are very smooth, the tape adheres to the roll upon reversal of the tape transport direction, or if the minimum tape speed is not reached. The effect of the roll being stationary during tape transportation is brought about deliberately according to the invention, whilst all prior art tape transports seek to avoid this by all possible means, as is illustrated by the prior art cited above.

Since the braking torque can be produced and adjusted by simple braking means, the object of the invention can be achieved at little expense. In every case, out-of-true running of the roll can be compensated.

In a further embodiment, the roll is provided with a surface roughness having a center line average value $R_a$ of less than 0.5 $\mu$m, especially of less than 0.28 $\mu$m. This reduces friction of the air against the roll's peripheral surface and favors the formation of a boundary layer between the tape and the roll.

In another embodiment, the guide roll is provided with flanges for guiding the longitudinal edges of the tape, which flanges can also be firmly connected to the chassis of the transport. In yet another embodiment, these flanges extend around only part of the periphery of the roll, and have ingress and egress chamfers for the tape. As a result of this design, stress on the tape is reduced, and lateral tape guidance is improved.

In further embodiments, either one or two guide rolls are provided, the magnetic head being located between a tape roll and the guide roll, or between the two guide rolls.

The formation of a boundary layer, as mentioned above, requires that the tape should be transported over the roll at high speed, that adequate tape tension should be maintained, and that the roughness of the roll surface should be less than 0.5 $\mu$m.

Between the roll's peripheral surface, where the air is at zero velocity, i.e. clings to the surface, and the tape, which produces virtually friction-free flow, there is a thin boundary layer, in which an abrupt increase in speed from zero up to the tape speed takes place. This layer extends from a zone of virtually friction-free motion to the inner edge of the boundary layer in which, not withstanding the low viscosity of the air, substantial friction is generated because of the high velocity gradient. For the boundary layer, the Navier-Stokes equations (cf. W. Kauffmann, Technische Hydro- und Aerodynamik, Springer Verlag 1963, pages 233-240) and in particular Prandtl's boundary layer theory apply. Regarding the creation of an air film during the transportation of a tape over a roll, see W. A. Gross, IBM Research Laboratory, San Jose, U.S.A., especially pages 138 to 141.

Surprisingly, we have found in practice that the boundary layer is formed most advantageously when the braking force acting on the roll corresponds to the frictional force which the tape indirectly exerts on the roll. If the speed is less than the minimum speed required to form the boundary layer, the increase in the indirect frictional force exerted on the roll causes the roll to turn with the tape, thereby avoiding slip between the roll and the tape.

The invention is described in more detail below with reference to the accompanying drawings, in which FIG. 1 is a schematic plan view of a tape transport with a central capstan and the reversing tape guide device according to the invention.

Figures 2, 3:
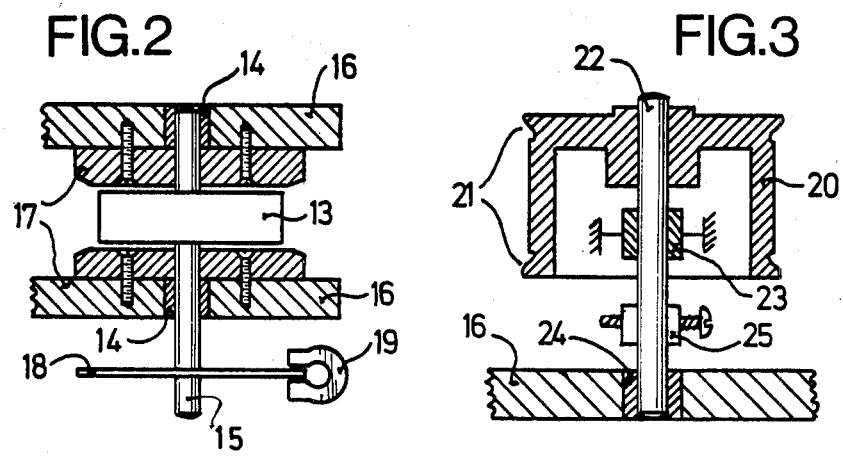

FIG. 2 is a schematic partial sectional view of a novel tape guide device with fixed flanges and an eddy current brake or hysteresis brake, FIG. 3 is a schematic partial sectional view of a further novel tape guide device with integral flanges and a block brake, FIG. 4 is a diagram of the frictional force of a block brake as a function of the tape speed, and FIGS. 5a and 5b show oscillograms relating to the time base error as a function of the frequency.

Referring to FIG. 1, a high-speed tape transport 5 consists essentially of the capstan 6 which is located between the take-up reel 7 and the supply reel 8 and, as it rotates in direction (a), drives the take-up reel in direction (b) and the supply reel in direction (c). A reversing tape guide device 9 (hereinafter referred to as roll for short) is located between the take-up reel 7 and the supply reel 8 and lies in the same horizontal and vertical planes as the capstan 6, the tape 10 being guided over the periphery of this roll. At least one recording and/or reproducing head 11 cooperates with the unsupported span of tape extending between the capstan 6 and the roll 9. The head 11 can be arranged inside or outside the tape loop, depending on how the tape 10 has been wound on the supply reel 8. In the present embodiment, the tape 10 is wound on the hubs with the base facing inwards, and accordingly the head 11 is located inside the loop.

Capstan 6 simultaneously drives in a virtually slip-free manner the take-up reel 7 and the supply reel 8, which are pressed against the capstan by biassing means (not shown in the drawing), via a resilient peripheral portion, so that the high-speed transportation of, in particular, thin (15 $\mu$m) or very thin (9 $\mu$m or less) magnetic tapes is possible.

The guide roll 9 has flanges 12 for lateral guidance of the tape 10, which flanges either rotate with the roll (FIG. 3) or are stationary (FIG. 2).

In practise it has been found that if the roll 9 rotates all the time, the tape is always in contact with the roll at a number of points on its periphery, resulting in abrasion of the peripheral surface which, in the extreme case when a sufficiently smooth patch has been produced on the roll, causes the tape 10 to stick thereto. Particularly if the direction of tape transportation constantly changes, the points on the roll's peripheral surface with which the tape makes contact also vary. Consequently, the tape is subjected to varying tensions, which manifests itself as tape flutter, especially in time base errors in the case of video signal recording.

We have found, surprisingly, that if the guide roll is braked in a definite manner, tape flutter can be reduced, and that, if the roll is braked to standstill during tape transportation, the time base error otherwise produced by the roll can be completely eliminated. The reason for this substantial improvement is considered to be the creation of a boundary layer which enables the tape to be transported on a layer of air above the roll's peripheral surface. After the boundary layer has been created, a frictional force is applied as a braking torque to the roll so as to cause the roll to stand still at and above a certain minimum tape speed, which is about 2–4 m/s. If the tape speed drops below this minimum value, for example upon reversal of the tape transport direction, or on starting or stopping the tape transport, the roll starts to rotate again because the boundary layer is no longer there and friction between the tape and the roll is consequently higher. As is clear from the literature references mentioned in the introduction, the friction depends on the tape tension and it is therefore advantageous to produce the braking torque acting on the guide roll by means of an adjustable braking device. Useful braking devices are shown in FIGS. 2 and 3.

With reference to FIG. 2, a disk-shaped roll 13 is rigidly connected to an axle 15 rotatably mounted in bearings 14. The bearings 14 are mounted in chassis parts 16 of the tape transport 5. Flanges 17 for guidance of the longitudinal edges of the tape are also fastened to parts 16, these flanges being arranged at least in the wraparound zone of the tape 10 on the roll. This combination of a rotating roll 13 with fixed flanges 17 alone suffices to reduce scrape flutter phenomena in tape transports (cf., for example, German Utility Model No. 78 20 877).

A metal disc 18, which projects into the air gap of a permanent magnet or electromagnet 19, is attached to the lower end of the axle 15. Depending on whether the metal is conductive or magnetic, an eddy current brake or a hysteresis brake is obtained, the braking force of which can be set to a fixed value in the case of a permanent magnet or varied in the case of an electromagnet.

FIG. 3 shows a hat-shaped roll 20 which has integral flanges 21 and is rigidly connected to an axle 22 rotatably mounted in chassis parts 16. One bearing, 23, is inside the roll 20, whilst the other, 24, is outside it. A block brake 25, comprising brake blocks and a screw, is provided between the bearings 23 and 24, and enables a definite braking force to be applied to the axle 22.

The braking devices 18, 19 and 25, described above, are illustrative examples of the various types and designs of braking devices which can be used. In addition to those which have been described, the following are examples of useful braking devices familiar to the skilled worker: single and multiple disc brakes, friction brakes acting on the bearings, centrifugal brakes and hydrodynamic brakes. The type of brake chosen will be governed by the particular circumstances.

In every case, the brake selected should be capable of producing a braking torque corresponding to a frictional force, acting at the periphery of the roll, of from 2 to 15 p, preferably from 2 to 10 p. For a roll diameter of 17.5 mm, the frictional forces correspond to a torque of from about $0.18 \times 10^{-3}$ Nm to 1.35 Nm, preferably from $0.18 \times 10^{-3}$ Nm to $0.9 \times 10^{-3}$ Nm. For example, the relevant data for a tape transport of the above-described type are as follows:

Diameter of guide roll = 17.5 mm
Distance between tape-guiding flanges = 8.05 mm for 8 mm wide tapes
Wraparound arc of the tape = 13.7 mm
Tape speed v = 4 m/s
Center line average value of roll's peripheral surface = 0.25 $\mu$m
Tape tension B = 40–60 p.

FIG. 4 diagrammatically shows the variation of the frictional force R as a function of the tape speed for tape tensions B of 40 pond and 60 pond. It is clear that at a certain minimum speed, at which the boundary layer is created, the frictional force drops substantially; in the present example this occurs at 2.5–3 m/s and 3.5–4 m/s for the two tape tensions respectively.

FIGS. 5a and 5b show two oscillograms concerning the time base error $\theta$ in nanoseconds (ns) as a function of the frequency f in hertz (Hz). M is the error signal of the drive motor for the capstan 6 and Ro the unwanted signal produced by the guide roll, in this case the hat-shaped roll 20.

In FIG. 5a, the time error of the motor M is about 200 ns. This oscillogram was obtained with an experimental apparatus employing a freely running, unbraked guide roll 20, the roll being less than 4 $\mu$m out of round and hence very expensive to manufacture. In contrast, oscillogram 5b was obtained with the same guide roll 20, but braked in accordance with the invention, all other parameters being the same.

Whilst the error signal M of the motor was roughly unchanged, the error signal Ro was no longer discernible, corresponding to a reduction in the unwanted signal of (2 ns/200 ns) = −40 db.

We claim:

1. A guide device for a recording medium in tape form, especially a magnetic tape, which is subjected to sharp acceleration in the lengthwise direction, comprising at least one guide roll rotatably mounted in bearing means, around which guide roll the transported recording medium is guided; and a means for applying a braking torque between the roll and the bearing means, said means for applying a braking torque providing a braking torque of a magnitude sufficient to keep said guide roll from rotating while the tape is transported, during normal operation, at a relatively high speed, wherein said guide roll and said means for providing a braking torque permit a boundary layer of air to be created between the transported tape and the guide roll, which eliminates all direct contact therebetween, but is of a magnitude insufficient to prohibit the tape from taking the guide roll along substantially without slippage at times when the tape is travelling at a relatively low speed.

2. A guide device as claimed in claim 1, wherein the braking torque applied between the roll and the braking means is of a magnitude corresponding to a frictional force of from 2 to 15 p acting at the guide roll periphery.

3. A guide device as claimed in claim 1, wherein the braking torque corresponds to a frictional force at the guide roll periphery of from 2 to 10 p.

4. A guide device as claimed in claim 1 or 3, wherein the center line average value $R_a$ of the guide roll's peripheral surface is less than 0.5 $\mu$m.

5. A guide device as claimed in claim 4, wherein the center line average value $R_a$ of the guide roll's peripheral surface is less than 0.28 $\mu$m.

6. A guide device as claimed in claim 1, wherein the guide roll is provided with flanges for the guidance of the longitudinal edges of the recording medium, the distance between the flanges being somewhat greater than the width of the medium.

7. A guide device as claimed in claim 6, wherein the flanges are rigidly connected to the chassis of the transport apparatus.

8. A guide device as claimed in claim 7, wherein the flanges extend around part of the periphery of the guide roll, and have ingress and egress chamfers for the recording medium.

* * * * *